UNITED STATES PATENT OFFICE.

THOMAS W. CAPPON, OF NEW YORK, N. Y.

CEMENTING MATERIAL AND PROCESS OF MAKING SAME.

No. 886,579.  Specification of Letters Patent.  Patented May 5, 1908.

Application filed April 11, 1904. Serial No. 202,646.

*To all whom it may concern:*

Be it known that I, THOMAS W. CAPPON, a citizen of the United States, residing in the city, county, and State of New York, have invented a certain new and useful Improvement in Cementing Material and Process of Making the Same, of which the following is a specification.

My present invention has relation to an improved form of cement or mortar wherein the carbonating of the lime is made independent of the carbon dioxid of the atmosphere, and wherein the necessary carbonic acid is supplied by appropriate chemical reactions within the mass.

Hardening action on my improved mortar or cement is further promoted by the simultaneous production of magnesium oxychlorid which hardness continues to increase with age for a long time.

In ordinary lime mortars, the hardening results from the conversion of the calcium hydrate into calcium carbonates, basic and normal, resulting from absorption of carbon dioxid from the surrounding air. The consequence is that in this case the hardening process only takes place progressively from the exposed surface inwards and the so called "egg shell" hardness results. It follows from the dependence of ordinary mortar upon contact with the carbonic acid of the atmosphere for hardening that such mortar becomes practically worthless in localities where the carbonic acid of the air is excluded; and for this reason its use is condemned even in out of door masonry where the walls are so thick that action from the surface becomes proportionately insignificant. In my improved mortar I provide for carbonating a due proportion of lime by certain special reactions. The materials are present throughout the body of the mortar or cement so that hardening takes place all through the mass instead of proceeding inward gradually from the surface. The hardening of my mortar or cement is therefore independent of any contact with carbonic acid at the surface and I may use it in many localities where ordinary mortars are not suitable.

I find that when calcium chlorid and magnesium carbonate are brought together with magnesium and calcium hydrate in the presence of water, a double decomposition takes place. The magnesium of the carbonate, taking the chlorin from the calcium unites with the magnesium hydrate to form magnesium oxy-chlorid, while the carbonic acid of the magnesium unites with the calcium to form a carbonate of lime which on reaction with the calcium hydrate present forms a basic carbonate. Both the magnesium oxychlorid and the carbonate of lime thus produced become elements of strength and hardness in the mortar. It is this carbonation of calcium chlorid by magnesium carbonate and hydrate combined which lies at the root of my improved process.

While my invention is applicable to use in mortars prepared or mixed immediately before use, I prefer to employ it in the production of dry mortar or cement which takes the form of a dry powdered mixture which becomes an effective mortar as soon as water is applied thereto.

The process of preparing my compound is a very simple one requiring neither heat nor addition of moisture.

The best results can be attained in accordance with my invention by mixing 4.76 per cent. of calcium chlorid with 7.14 per cent. of magnesium carbonate, about 40 per cent. of magnesium hydrate and 48 per cent. of calcium hydrate. These ingredients are preferably all mixed together in a dry state, although I am not confined to the use of dry materials. Any well known mixing means may be employed. The proportions above stated are to be calculated by weight.

The above proportions are suitable where air is not totally excluded, but it is to be understood that they may be greatly varied and that where air is completely excluded it is better to use a larger proportion of the first three ingredients than is above stated. These may in such cases be doubled or even tripled without injurious results. The cement produced substantially as above stated is useful where mixed with sand, powdered stone or the like, the proportions of which can be varied to suit the circumstances.

My present invention is independent of the sources of the materials and of the particular processes whereby these materials are produced either separately or together.

What I claim is:—

1. The process of carbonating mortar and cement from within, which consists in carbonating calcium chlorid by the combined action of powdered magnesium carbonate and magnesium hydrate in the presence of water, whereby the carbonation of the lime is produced throughout the mass independently of the carbonic acid of the air, substantially as described.

2. The process of making a mortar or cement, which consists in mixing calcium chlorid with magnesium carbonate and magnesium hydrate, substantially as described.

3. The process of making a mortar or cement, which consists in mixing calcium chlorid with magnesium carbonate, magnesium hydrate and calcium hydrate in substantially the proportions hereinbefore specified, substantially as described.

4. A dry cement powder consisting of a mixture of calcium chlorid, magnesium carbonate and magnesium hydrate, substantially as described.

5. A dry cement powder consisting of a mixture of calcium chlorid, powdered magnesium carbonate and powdered magnesium and calcium hydrates, substantially as described.

6. A dry cement powder consisting of about 4.76 per cent. of calcium chlorid, 7.14 per cent. of magnesium carbonate, 40 per cent. of magnesium hydrate and 48 per cent. of calcium hydrate all mixed in a dry powdered form, substantially as described.

7. A mortar or cement composed of a wet mixture of calcium chlorid, magnesium carbonate and magnesium hydrate, substantially as described.

8. A mortar or cement composed of a mixture of calcium chlorid, magnesium carbonate, magnesium hydrate and calcium hydrate, substantially as described.

9. A mortar or cement composed of a mixture of calcium chlorid, magnesium carbonate and calcium hydrate, substantially as described.

10. As a means for accomplishing carbonation of cementing salts without contact with the atmosphere for hardening cement, mixing the same with magnesium carbonate and water in the presence of magnesium hydrate, substantially as described.

THOMAS W. CAPPON.

Witnesses:
H. S. MACKAYE,
FLORENCE PICK.